United States Patent [19]
Dalton

[11] 3,796,232
[45] Mar. 12, 1974

[54] ROTARY DIRECTION FLOW CONTROL VALVE

[75] Inventor: Thomas B. Dalton, Muskegon, Mich.

[73] Assignee: Westran Corporation, Muskegon, Mich.

[22] Filed: Oct. 19, 1972

[21] Appl. No.: 298,943

[52] U.S. Cl.......... 137/625.21, 91/436, 137/625.43, 137/625.46
[51] Int. Cl............................................ F15b 13/04
[58] Field of Search .... 91/436; 137/625.15, 625.18, 137/625.19, 625.21, 625.22, 625.23, 625.24, 625.42, 625.43, 625.46

[56] References Cited
UNITED STATES PATENTS

| | | | |
|---|---|---|---|
| 1,717,012 | 6/1929 | Dixon | 137/625.43 X |
| 2,696,219 | 12/1954 | Barksdale | 137/625.21 X |
| 2,745,434 | 5/1956 | Stevenson | 137/625.43 |
| 2,583,242 | 1/1952 | Turkenkoph et al. | 137/625.43 X |
| 3,368,583 | 2/1968 | Weaver | 137/625.46 |
| 3,411,525 | 11/1968 | Auger | 137/625.46 X |
| 3,477,207 | 11/1969 | Auger | 137/625.46 X |

Primary Examiner—Alan Cohan
Assistant Examiner—Gerald A. Michalsky
Attorney, Agent, or Firm—Hauke, Gifford, Patalidis & Dumont

[57] ABSTRACT

A rotary valve for selectively controlling the direction of fluid flow between a source of pressure fluid and a fluid user. The rotary valve comprises a housing having a stator with a valve face having four diametrically opposed and arcuately spaced ports adapted to register in a selected manner with a plurality of arcuately spaced ports formed in the adjacent face of a coaxially disposed rotor. One of the stator ports is adapted to be communicated to a source of fluid pressure, while a second diametrically opposed port is adapted to be communicated to a reservoir. The remaining diametrically opposed ports in the valve face of the stator are each adapted to be communicated to a fluid user. The rotor has a T-shaped passage connecting three of the ports and a pair of separated transversely extending passages connecting pairs of ports disposed intermediate the ports connected with the T-shaped passages. The transverse passages are disposed at a different depth than the T-shaped passages so that there is no intersection between the passages.

8 Claims, 13 Drawing Figures

PATENTED MAR 12 1974 3,796,232
SHEET 1 OF 2
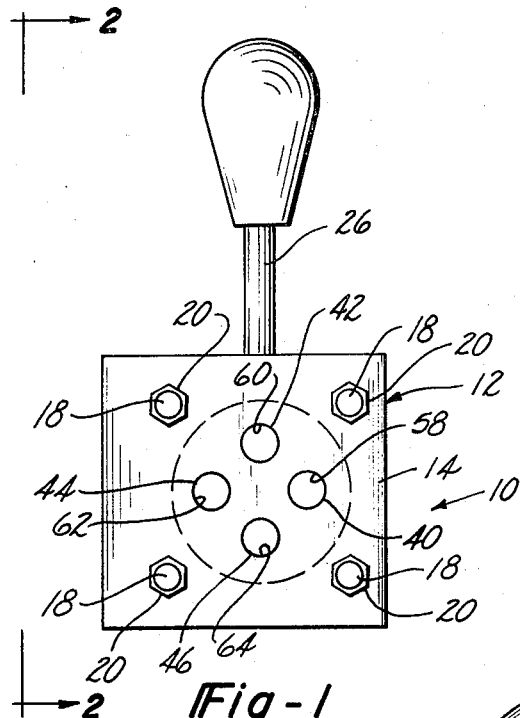
Fig-1
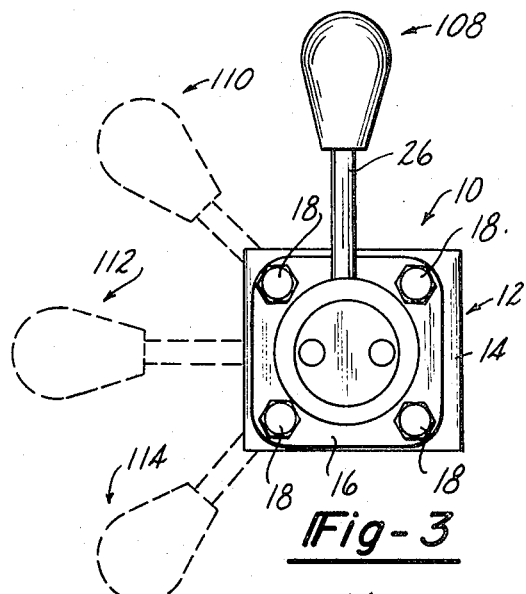
Fig-3
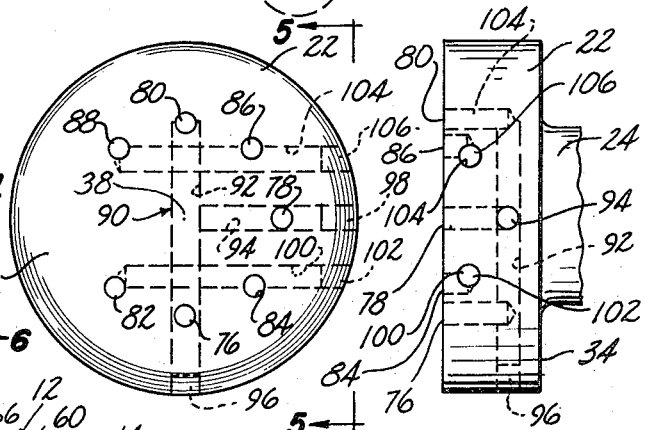
Fig-4
Fig-5
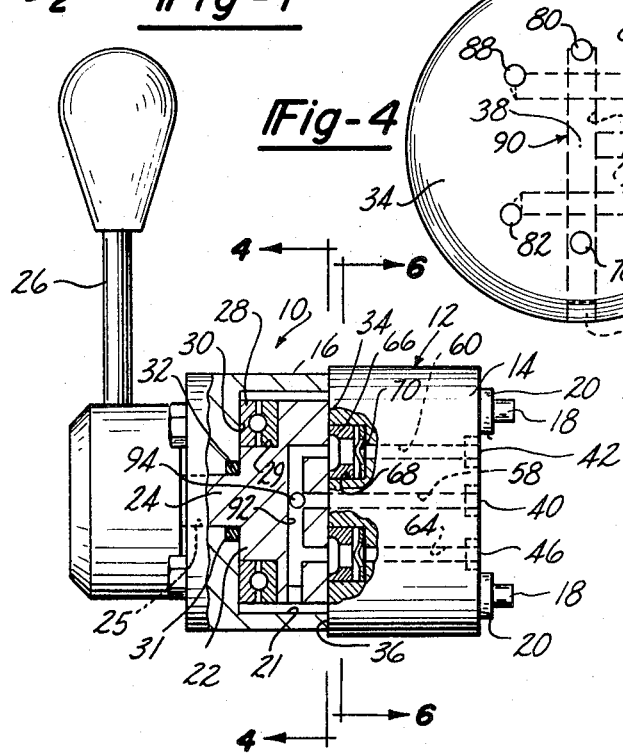
Fig-2

3,796,232

ROTARY DIRECTION FLOW CONTROL VALVE

BACKGROUND OF THE INVENTION

I. Field of the Invention

The present invention relates to directional flow control valves and, in particular, to a rotary directional flow control valve having a rotor with a plurality of ports formed by passages extending parallel to the axis of rotation of the rotor and a plurality of internal, separated passages disposed at different depths for connecting the ports to complete a selected fluid circuit through the valve.

II. Description of the Prior Art

Heretofore, rotary control valves, especially those used to control several fluid paths, have been quite complicated and therefore quite expensive. A substantial part of this cost is the result of the machining necessary to provide the ports and the passages connecting these ports in the face of the rotor. Further, to my knowledge, there has not been a rotary valve which can be utulized to actuate a fluid user, such as a fluid cylinder, to more than the usual extension and retraction positions.

SUMMARY OF THE PRESENT INVENTION

The present invention, as will be described subsequently in greater detail, comprises a directional flow control valve of the rotary type which is not only capable of use to control extension and retraction of a fluid cylinder or the like but which also includes regenerative and lock-out modes of operation. This is accomplished by providing a stator with a high pressure port, a reservoir port and a pair of user ports which are alternately registered with a plurality of ports disposed in a rotor as the same is rotated to selectively communicate a source of pressure to a fluid user. The rotor ports are connected to each other in a defined manner to complete the desired fluid path. The passages connecting the ports are separated from each other by disposing them in the rotor at different depths.

BRIEF DESCRIPTION OF THE DRAWINGS

The description herein makes reference to the accompanying drawings wherein like reference numerals refer to like parts throughout the several views, and in which:

FIG. 1 is a rear elevational view of a rotary directional flow control valve constructed in accordance with the principles of the present invention;

FIG. 2 is a partially cross-sectioned view of the rotary directional flow control valve taken along line 2—2 of FIG. 1;

FIG. 3 is a front elevational view of the rotary directional flow control valve illustrated on a reduced scale;

FIG. 4 is an enlarged fragmentary cross-sectional view of the rotary directional flow control valve as taken along line 4—4 of FIG. 2;

FIG. 5 is a fragmentary view of the directional flow control valve as seen from line 5—5 of FIG. 4.

DESCRIPTION OF THE PREFERRED EMBODIMENT

Figure 6:
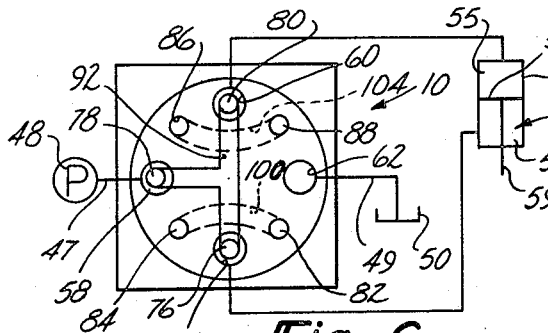
FIGS. 6 through 13 are schematic illustrations of the various modes of operation of the rotary directional flow control valve illustrated in FIG. 1.

Referring to the drawings and in particular to FIGS. 1-3, there is illustrated a directional flow control valve 10 of the rotary valve type comprising a housing 12, which as can best be seen in FIG. 2 consists of a stator 14 and a cover 16 secured to the stator 14 by elongated bolts 18 extending through bores in the cover 16 and stator 14 into threaded engagement with lock nuts 20. Also, as can best be seen in FIG. 2, the cover 16 defines a chamber 21 in which a rotor 22 is mounted. The rotor 22 has a shaft portion 24 which extends axially through an aperture 25 in the cover 16. An actuating lever 26 is secured to the shaft portion 24 to extend radially therefrom as shown. The actuating lever 26 is adapted to rotate the rotor 22 to selected arcuate positions as will be described. An annular bearing, such as thrust bearing 28, is positioned between an annular recess 29 in the rotor and the inner surface 30 of the cover 16 to enable the rotor 22 to be easily rotated by the actuating lever 26. A suitable seal, such as O-ring 31, is provided in an annular groove 32 and surrounds the shaft portion 24 of the rotor 22 to prevent fluid leakage.

The inner face 34 of the rotor 22 is disposed in a substantially parallel and opposing relationship to the inner face 36 of the stator 14, with the inner face 34 of the rotor 22 being adapted for relative rotating, sliding enagement with respect to the stator face 36 as the rotor 22 is rotated about its axis by the actuating lever 26.

As can best be seen in FIG. 1, the stator 14 has four fluid fittings 40, 42, 44 and 46 disposed in a circular array and equally spaced from one another. In the preferred embodiment, the fitting 40 is adapted to be connected to an exterior fluid conduit, such as a hydraulic line 47 as schematically illustrated in FIG. 6, which is connected to a source of pressure fluid, such as the fluid pump 48, while the diametrically opposed fitting 44 is adapted to be connected to another fluid conduit 49, which is a return line connected to a reservoir 50. The remaining diametrically opposed ports 42 and 46 are each connected to the ports of a fluid user such as a hydraulic motor of either the rotary or linear type.

In FIG. 6, a fluid cylinder 51 is schematically shown as comprising a housing 52 within which a piston 53 is reciprocated when pressure fluid is communicated to one of the pressure chambers 55 or 57 on the opposite sides of the piston 53 to respectively extend or retract a connecting rod 59 carried by the piston 53.

Referring to FIGS. 1 and 2, the fittings 40, 42, 44 and 46 communicate respectively with parallel passageways 58, 60, 62 and 64 which extend through the stator 14 to the stator inner face 36 (see FIGS. 6, 8, 10 and 12). As best seen in FIG. 2, in order to provide an effective seal between the rotor inner face 34 and the stator inner face 36, especially when the rotor 22 is being rotated from one arcuate position to another arcuate position, a sealing ring 66 is positioned in a cup-shaped recess 68 at the terminal end of each of the passageways 58, 60, 62 and 64. Each of the sealing rings 66 is biased toward a sealing engagement with the adjacent face 34 of the rotor 22 by springs 70 being against the bottom of each cup-shaped recess 68 and the adjacent end of each sealing ring 66. Although only a single sealing assembly has been shown and described, it is to be understood that such an assembly is provided for each of the passages 58, 60, 62 and 64.

Referring to FIGS. 4 and 5, the rotor 22 is illustrated on an enlarged scale as having three sets of fluid ports; the first set being comprised of the ports 76, 78 and 80, the second set being comprised of ports 82 and 84, and the third set being comprised of ports 86 and 88. The first set of ports 76, 78 and 80 are in constant fluid communication by means of a T-shaped passageway 90 formed by a pair of intersecting passages 92 and 94, closed at the peripheral surface of the rotor 22 by plugs 96 and 98, respectively. The second set of ports 82 and 84 are both fluidly connected by a passage 100, which in turn is closed at the outer periphery of the rotor 22 by a plug 102, while the third set of ports 86 and 88 are fluidly connected by means of a passage 104 which is similarly closed at the outer periphery of the rotor 22 by a plug 106.

It can thus be seen that whenever any of the rotor ports 76, 78 or 80 is in fluid communication with a pressure fluid, the other two ports are also in fluid communication via the fluid passageway 90. Similarly, when the port 86 (or 84) is in fluid communication with pressure fluid, the other port 88 (or 82) is also in communication with the pressure fluid.

Each of the ports 76–88 is radially spaced from the axis of rotation 38 of the rotor 22 by the same radial distance as the passages 58, 60, 62 and 64 in the opposing face 36 of the stator 14, and thus as the rotor 22 is rotated about its axis 38 by the actuating lever 26, one or more of the ports in the rotor face 34 will register with one or more of the ports in the stator face 36.

FIGS. 6, 8, 10 and 12 are schematic illustrations of the directional flow control valve 10, as viewed along line 6—6 of FIG. 2, with the ports in the rotor face 34 being superimposed upon the ports in the stator face 36. FIGS. 7, 9, 11 and 13 respectively represent a conventional hydraulic symbol for each of the operational modes of the directional control valve 10 respectively illustrated in FIGS. 6, 8, 10 and 12.

As can be seen in FIG. 3, the actuating lever 26 is adapted to be selectively rotated counterclockwise between a first position 108, which positions the valve in a regenerative mode, a second position 110 which positions the valve in a power expansion mode, a third position 112 which positions the valve in a locking mode, and a fourth position 114 which positions the valve in a power retraction mode.

Figure 7:
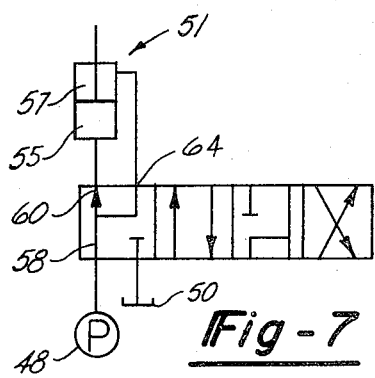

FIGS. 6 and 7 illustrate the valve 10 in a regenerative mode in which a source of fluid pressure, such as the pump 48, is in communication with the passage 58 and which pressure fluid is desired to be communicated to the pressure chamber 55 of the fluid chamber 51 so as to extend the fluid cylinder 51. In the regenerative mode, pressure fluid is directed to chamber 55 through passage 58, port 78, passage 90, port 80 and passage 60. The pressure fluid in the chamber 55 acts against the piston 53 causing the connecting rod 59 to be extended from the cylinder 51, while at the same time the chamber 57 is being compressed forcing the fluid therein to the expanding chamber 55 via the valve 10, all of which results in a faster extension of the connecting rod 59.

Figure 8:
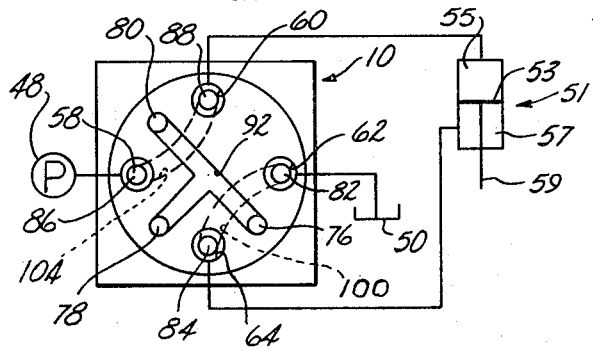
Figure 9:
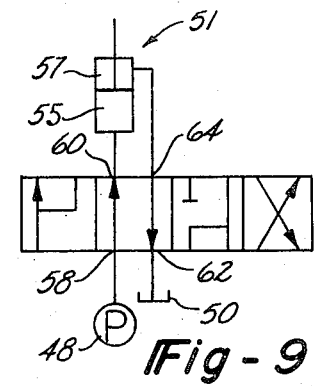

When the actuating lever 26 is rotated 45° to the power extension position 110 illustrated in phantom lines in FIG. 3, the rotor face 34 is positioned, as illustrated schematically in FIGS. 8 and 9, such that the ports 86 and 88 in a face 34 are respectively aligned with the pressure passage 58 and the passage 60, while the rotor ports 82 and 84 are respectively aligned with the reservoir passage 62 and the passage 64 such that pressure fluid from the pump 48 is communicated through the pressure passage 58, the passage 104 and the passage 60 to the cylinder chamber 55 to cause the same to expand in a power extension mode, while fluid in the other chamber 57 is exhausted from the fluid cylinder 51 to the passage 64 through the rotor passage 100 and exhausted from the valve 10 through the passage 64 back to the reservoir 50. It should be noted that the remaining rotor ports 76, 78 and 80 are not in communication with any of the stator ports and thus during this mode these ports are not operational.

Figure 10:
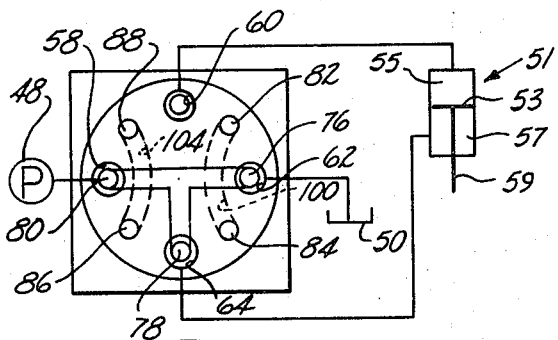
Figure 11:
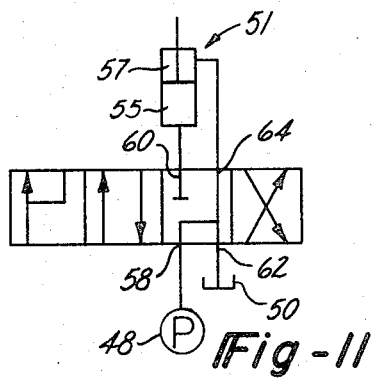

When the actuating lever 26 of the valve 10 is rotated another 45° to the locking mode position 112, illustrated in FIG. 3, the valve 10 assumes the position illustrated in FIGS. 10 and 11 in which the ports 82, 84, 86 and 88 are moved to an arcuate position wherein they are not in fluid communication with the stator ports and thus during this mode these ports are not operational. The ports 80, 78, and 76, however, are respectively aligned with and in fluid communication with the pressure passage 58, the passage 64 and the reservoir passage 62, and thus pressure fluid from the pump 48 is directed to the reservoir 50 and to the chamber 57 in the fluid cylinder 51. Flow from chamber 55 is blocked by the face 34 of the rotor 22 and thus the fluid cylinder piston 53 is locked in position.

Figure 12:
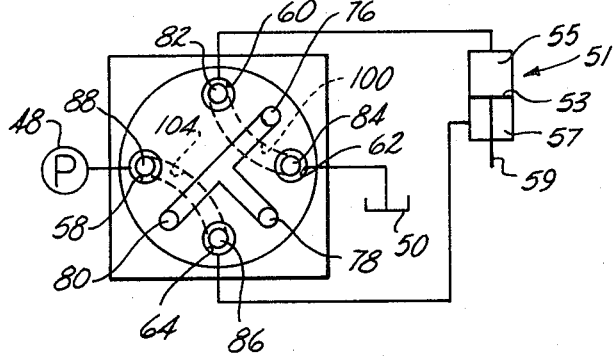
Figure 13:
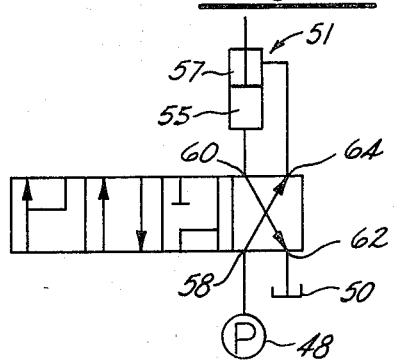

When it is desired to reverse the direction of movement of the fluid cylinder piston 53, that is to retract the connecting rod 59, the actuating lever 26 of the valve 10 is moved another 45°, as illustrated in FIG. 3, to the power retract mode position 114, whereupon, as shown in FIGS. 12–13, the ports 88 and 86 in the rotor face are respectively fluidly connected to the pressure passage 58 and the passage 64 such that pressure fluid is communicated from the pump 48 to the pressure chamber 57, wherein the pressure fluid exerts a force against the piston 53 to move the same and compress the other chamber 55 exhausting fluid therefrom to the passage 60, into the port 82 of the rotor, through the rotor passage 100 to the rotor port 84 and passage 62 and on to the reservoir 50.

It can thus be seen that the present invention has provided an extremely simple, inexpensive and compact directional flow control valve of the rotary type capable of operating a fluid user such as a fluid cylinder through a plurality of operating modes.

Although only one embodiment of the present invention has been disclosed, it is to be understood by those skilled in the art of directional flow control valves that other forms may be had, all coming within the spirit of the invention and the scope of the appended claims.

What is claimed is as follows:

1. A rotary directional flow control valve for use in controlling a fluid user, said valve comprising:

a stator and a rotor coaxially disposed and having substantially parallel opposing end surfaces adapted for relative sliding engagement as said rotor is rotated with respect to said stator about their common axis;

a plurality of passages in said stator adapted to be connected respectively to a source of pressure fluid, a reservoir and the fluid user, said passages opening to said rotor in positions equally radially spaced from the axis of rotation of the rotor; and
a plurality of ports disposed in said rotor in a position to register with said stator passages upon rotation of said rotor with respect to said stator, said ports comprising a first set of three ports all connected by a first passage formed in said rotor, a second set of ports connected by a second passage in said rotor and a third set of ports connected by a third passage in said rotor, said passages in said rotor being separated from one another and said ports being arranged such that when any one port of any of said sets of ports in said rotor is connected with one of said stator passages then all of said ports in that set are also connected with stator passages.

2. The valve as defined in claim 1 and in which said first passage is at a distance from said rotor end surface different than the distances of said second and third passages from said rotor end surface.

3. The valve as defined in claim 1 and in which said rotor is rotatable to a position in which one of said ports of said second set of ports is connected with the passage in said stator connected with said source of pressure fluid, and another of said ports in said second set of ports is connected with a passage of said stator connected with said fluid user; and one of said ports of said third set of ports is connected with a passage in said stator connected with said reservoir, while another of said third set of ports is connected with a passage in said stator connected with said fluid user.

4. The valve as defined in claim 1 and in which said rotor passages include straight sections extending perpendicular to the axis of rotation of said rotor and straight sections extending parallel to the axis of rotation of said rotor.

5. The valve as defined in claim 4 and in which the straight sections of the passages connecting said second and third sets of ports are spaced differently from said end face of said rotor than the straight section of the passage connecting said first set of ports.

6. A rotary directional flow control valve for use in controlling a fluid user, said valve comprising:
a stator and a rotor coaxially disposed and having substantially parallel opposing end surfaces adapted for relative sliding engagement as said rotor is rotated with respect to said stator about their common axis;

a plurality of passages in said stator adapted to be connected respectively to a source of pressure fluid, a reservoir and the fluid user, said passages opening to said rotor in positions equally radially spaced from the axis of rotation of the rotor;

a plurality of ports disposed in said rotor in a position to register with said stator passages upon rotation of said rotor with respect to said stator, said ports comprising a first set of ports all connected by a first passage formed in said rotor, a second set of ports connected by a second passage in said rotor and a third set of ports connected by a third passage in said rotor, said first passage is T-shaped and the number of ports in said first set of ports is three, said passages in said rotor being separated from one another and said ports being arranged such that when any one port of any of said set of ports in said rotor is connected with one of said stator passages then all of said ports in that set are also connected with stator passages.

7. The valve as defined in claim 6 and in which said rotor is rotatable to a position in which two of the ports of said first set of ports are connected to passages in said stator connected with said fluid user, and the third port in said first set of ports is connected with the passage in said stator connected with said source of pressure fluid.

8. The valve as defined in claim 6 and in which said rotor is rotatable to a position in which one of said ports of said first set of ports is connected with passages in said stator connected with said source of fluid pressure, the second port in said first set of ports is connected with a passage in said stator connected with said fluid reservoir, and the third port in said first set of ports is connected with a passage in said stator connected with said fluid user.

* * * * *

UNITED STATES PATENT OFFICE
CERTIFICATE OF CORRECTION

Patent No. 3,796,232            Dated March 12, 1974

Inventor(s) Thomas B. Dalton

It is certified that error appears in the above-identified patent and that said Letters Patent are hereby corrected as shown below:

Column 2, line 20, after "rotor", insert -- 22 --; line 44, delete "ports" and insert -- fittings --; line 53, delete "passageways" and insert -- passages --; lines 62 and 63, delete "passageways" and insert -- passages --; line 64, delete "being" and add -- bearing --. Column 3, lines 9 and 22, delete "passageway" and insert -- passage --; lines 31, 32 and 35, after "ports", insert -- 76-88 --; line 54, delete "chamber", second occurrence, and insert -- cylinder --. Column 4, line 43, after "rotor", insert -- 22 --. Column 5, line 15, after "with" insert -- said --.

Signed and sealed this 1st day of October 1974.

(SEAL)
Attest:

McCOY M. GIBSON JR.
Attesting Officer

C. MARSHALL DANN
Commissioner of Patents